United States Patent [19]

Fukushima

[11] Patent Number: 4,855,654
[45] Date of Patent: Aug. 8, 1989

[54] ROTARY BODY DRIVE DEVICE

[76] Inventor: Nobuo Fukushima, 1-5, Moegino, Midori-ku, Yokohama-shi, Kanagawa-ken, Japan

[21] Appl. No.: 88,979

[22] Filed: Aug. 21, 1987

Related U.S. Application Data

[63] Continuation of Ser. No. 839,058, Mar. 13, 1986, abandoned.

[30] Foreign Application Priority Data

Mar. 16, 1985 [JP] Japan .................................. 60-53144
Mar. 16, 1985 [JP] Japan .................................. 60-53145

[51] Int. Cl.$^4$ .............................................. H04N 5/93
[52] U.S. Cl. ........................... 369/47; 318/603; 318/608; 318/341; 360/70; 360/73.03; 388/813; 388/923; 388/828
[58] Field of Search ........................ 318/314, 599–610, 318/618, 621, 628, 310, 317, 318, 321, 326, 327, 329, 341; 360/70, 71, 73, 74.1, 74.2, 74.4, 75, 77, 81, 86

[56] References Cited

U.S. PATENT DOCUMENTS

| | | | |
|---|---|---|---|
| 3,503,058 | 3/1970 | Ault et al. | 360/73 |
| 3,934,269 | 1/1976 | Fujita et al. | 318/327 X |
| 4,003,090 | 1/1977 | Beck | 360/70 |
| 4,127,881 | 11/1978 | Wakami et al. | 360/73 X |
| 4,271,382 | 6/1981 | Maeda et al. | 318/314 X |
| 4,301,395 | 11/1981 | Furuhata et al. | 318/314 |
| 4,307,417 | 12/1981 | Tokuyama | 360/70 X |
| 4,316,143 | 2/1982 | Castle | 318/628 X |
| 4,338,683 | 7/1982 | Furukawa et al. | 360/73 X |
| 4,355,266 | 10/1982 | Pearson | 318/314 X |
| 4,386,300 | 5/1983 | Ogawa | 318/329 X |
| 4,432,021 | 2/1984 | Kaneko | 360/77 X |
| 4,441,061 | 4/1984 | Yoshida et al. | 318/341 X |
| 4,484,235 | 11/1984 | Yokobori et al. | 360/70 X |
| 4,498,034 | 2/1985 | Shirakawa | 318/314 |
| 4,500,822 | 2/1985 | Tajima et al. | 318/314 |
| 4,506,202 | 3/1985 | Tajima et al. | 318/603 |
| 4,539,606 | 9/1985 | Itoh | 360/70 |
| 4,542,423 | 9/1985 | Kotake et al. | 360/73 |
| 4,543,516 | 9/1985 | Kobori et al. | 318/327 X |
| 4,562,394 | 12/1985 | Itoh | 318/608 |
| 4,568,986 | 2/1986 | Furuhata et al. | 360/73 X |
| 4,599,545 | 7/1986 | Moriki et al. | 318/314 |
| 4,603,412 | 7/1986 | Yamazaki | 360/73 X |
| 4,605,976 | 8/1986 | Ito et al. | 360/73 X |
| 4,613,799 | 9/1986 | Sumi | 318/318 X |
| 4,623,939 | 11/1986 | Machida et al. | 360/73 X |
| 4,710,825 | 12/1987 | Okita et al. | 318/318 |

Primary Examiner—William M. Shoop, Jr.
Assistant Examiner—Paul Ip

[57] ABSTRACT

A rotary body drive device for controlling rotation of a motor on the basis of the phase difference between a periodic signal produced in accompaniment with rotation of the motor and a reference clock signal so that their phase relationship becomes a prescribed one. When the phase difference between both signals detected in a certain state is largely different from that detected in the preceding time, a correction is given to the phase difference of both signals detected in the aforesaid certain state, so that the rotation of said motor is controlled in accordance with the corrected phase difference.

23 Claims, 6 Drawing Sheets

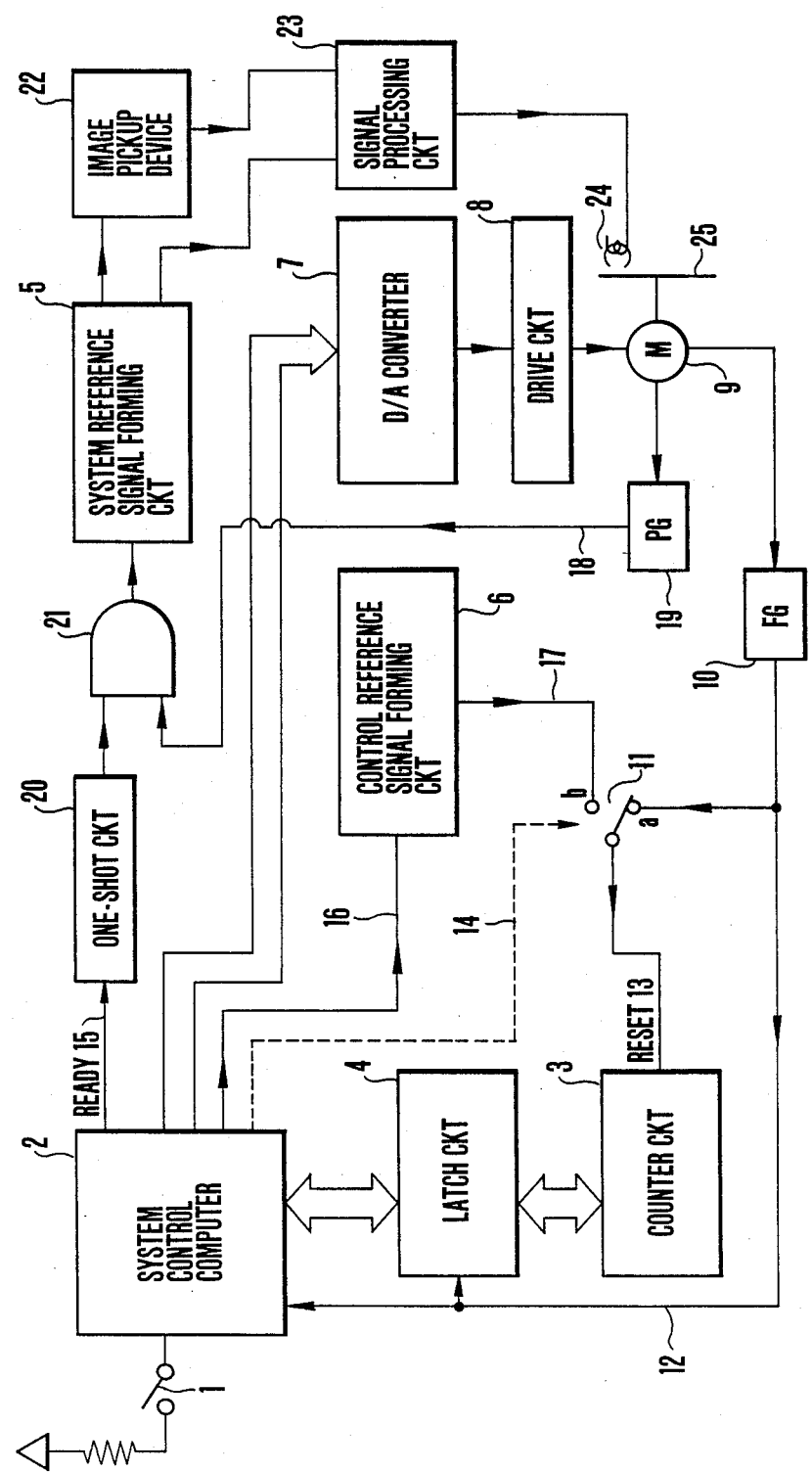
F I G. 2

ROTARY BODY DRIVE DEVICE

This is a continuation of application Ser. No. 839,058, filed Mar. 13, 1986 abandoned.

BACKGROUND OF THE INVENTION

1. Field of the Invention

This invention relates to rotary body drive devices, and, more particularly, to such drive device which effectively performs rotational driving of a record bearing medium.

2. Description of the Prior Art

In a rotary body drive device, such as a device for rotational driving of, for example a magnetic disk in, for example, an electronic still camera, the driving of a motor has been controlled in such a manner that its phase is brought into coincidence with a reference signal for controlling the timing of operations of the camera as a whole. It has, therefore, taken, a long time to control the phase of the motor. This has led to degradation in the response characteristics of the camera.

Also, as the method of phase control, it may be considered that the phase of a pulse of a frequency generator (FG) cooperative with the motor is synchronized in delay of $\pi$ with that of the reference signal. In this case, however, the dynamic range of phase control is limited to comform with a range of delayed phases of the FG pulse by 0 to $2\pi$ from the reference signal.

Yet, by a sharp load change on the motor or the like, the phase difference will probably exceed the aforesaid controllable range. For example, if, as shown in FIG. 1, the phase difference between the reference signal and the FG pulse sampled for an (n−1)st cycle of control has been about $(15/8)\pi$ and the phase of the FG pulse is delayed by more than $(\frac{1}{8})\pi$ from the reference signal at the next sampling time, or until the n-th cycle, the phase delay of the FG pulse from the reference signal amounts to more than $2\pi$. By such a phase control method as described above, however, in this case, the phase discrepancy will be determined to become smaller. Thus, the prior art method had a drawback that proper control becomes at times impossible.

SUMMARY OF THE INVENTION

A first object of the invention is to eliminate the above-described problem and to provide a rotary body drive device of increased control accuracy.

A second object of the invention is to provide a rotary body drive device of the phase control type in which the phase control range is extended.

A third object is to provide a rotary body drive device stabilized against a large load change or unevenness of rotation of the rotary body due to external disturbance.

Under such objects, according to a preferred embodiment of the invention, a device is disclosed comprising rotation drive means for driving a rotary body, detecting means for detecting the phase of rotation of the rotary body, and a reference signal source for controlling the rotation period of said rotary body, whereby the amount of variation of the phase difference between the rotation phase detected by said detecting means and the output of said reference signal source is detected, and if the detected amount of variation is larger than a prescribed maximum allowable phase variation width, said amount of variation is corrected, and said rotation drive means is operated on the basis of the corrected amount of variation.

A fourth object of the invention is to provide a rotary body drive device having a shortened time from actuation to lock-in of the phase servo.

Other objects of the invention will become apparent from the following description of embodiments thereof.

BRIEF DESCRIPTION OF THE DRAWINGS

FIG. 2 is a block diagram of an embodiment of an electronic still camera including a rotary body drive device according to the invention.

DETAILED DESCRIPTION OF THE PREFERRED EMBODIMENT

Figure 1:
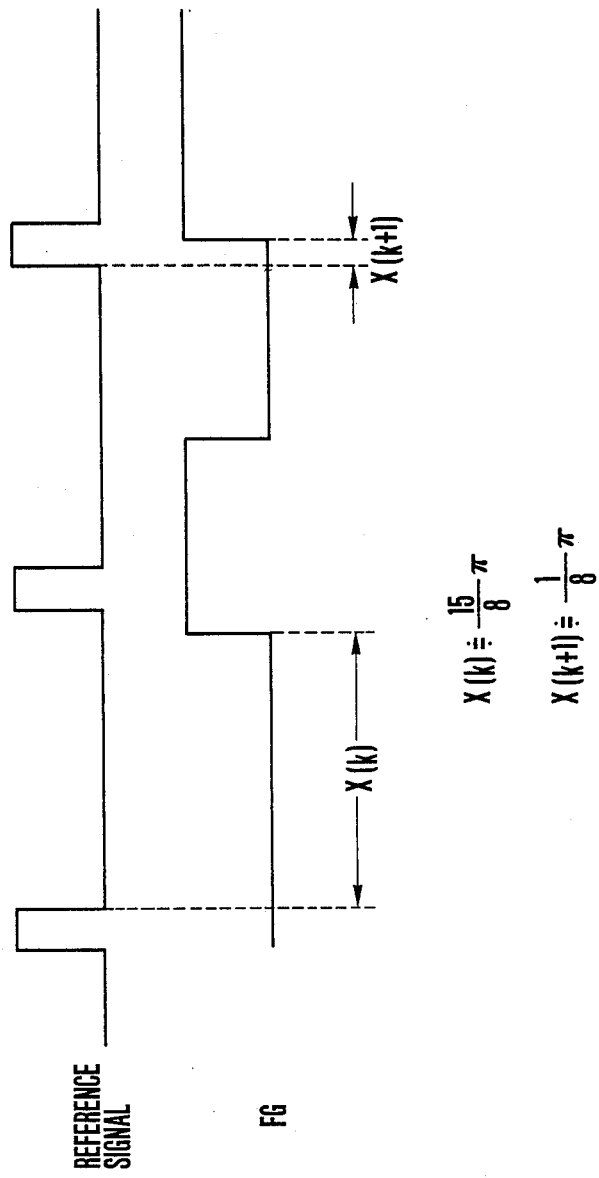
FIGS. 1, 3 and 6 illustrate examples of the timing of a reference signal and an FG pulse signal, particularly with FIG. 6 being a timing chart taken to explain the execution of a flowchart shown in FIGS. 4 and 5.

In FIG. 2 there is shown an embodiment of a rotary body drive device according to the present invention applied to an electronic still camera in which a disk-shaped record bearing medium is driven to rotate. 1 is a motor start switch. A system control computer 2, for controlling the operations of all parts of the camera, includes a CPU, a RAM, a ROM for storing a program such as that shown in FIGS. 4 and 5, and a counter. A timer counter 3 is reset by the rising edge of an input signal and then starts to count from 0. A latch circuit 4 holds the content of the timer counter circuit 3 each time the rising edge of the input signal appears. These parts 2, 3 and 4 constitute phase control means. A system reference signal forming circuit 5 produces a timing signal (synchronizing signal) for any apparatus having the motor built therein (electronic still camera). A motor control reference signal forming circuit 6 produces a signal that functions as the reference for phase control of the motor. A D/A converter 7 converts the output of the system control computer 2 to an analog value. A motor drive circuit 8 amplifies the output of the D/A converter 7 to produce a motor control signal. 9 is a motor and serves as the rotation drive means.

Means for detecting the phase of rotation of the motor 9 is constructed with, for example, MR elements in the form of a frequency generator (FG) circuit 10 for producing, for example, sixteen pulses for every one revolution of the motor 9. A motor selector switch 11 responsive to a signal 14 moves between two throws, a and b, for speed control and phase synchronizing modes respectively. A phase signal generator (PG) 19 produces one pulse of H level for every one rotation of the motor 9 in synchronism with the phase of the motor 9. An AND gate 21 takes the logical product of the outputs of a one-shot circuit 20 and the PG 19.

There are input or output lines 12 for the output signal from the FG circuit 10, 13 for a RESET signal to a "reset" input terminal of the counter circuit 3, 15 for a READY signal from the computer 2 which signal takes H level when in phase synchronization and L level when out of phase synchronization, 16 for a reference signal generation timing signal from the computer 2, 17 for a reference signal from the control reference signal forming circuit 6, and 18 for the output signal of the PG 19. When the READY signal 15 changes from L to H level, that is, when the phase synchronization is established, the one-shot circuit 20 produces one pulse of H level whose width is substantially equal to the period of the FG signal of the motor.

The camera further includes an image pickup device 22, a signal processing circuit 23, these, parts 22 and 23 operating in synchronism with the timing signal (synchronising signal) from the system reference signal forming circuit 5, a head 24, and a record bearing medium 25 serving as the rotary body.

Figure 3:
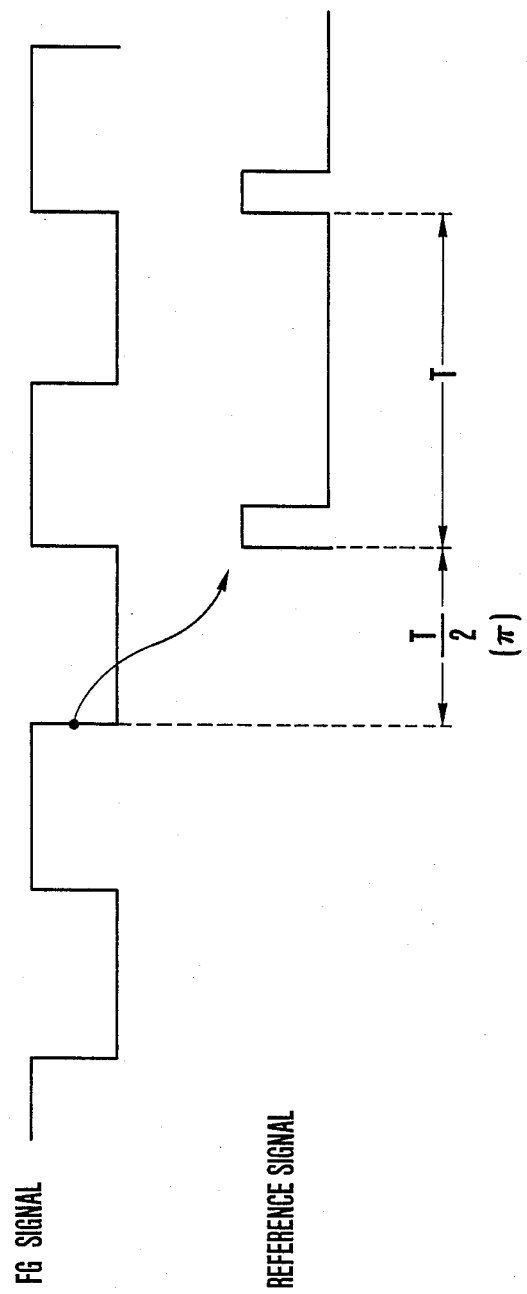
Figure 4:
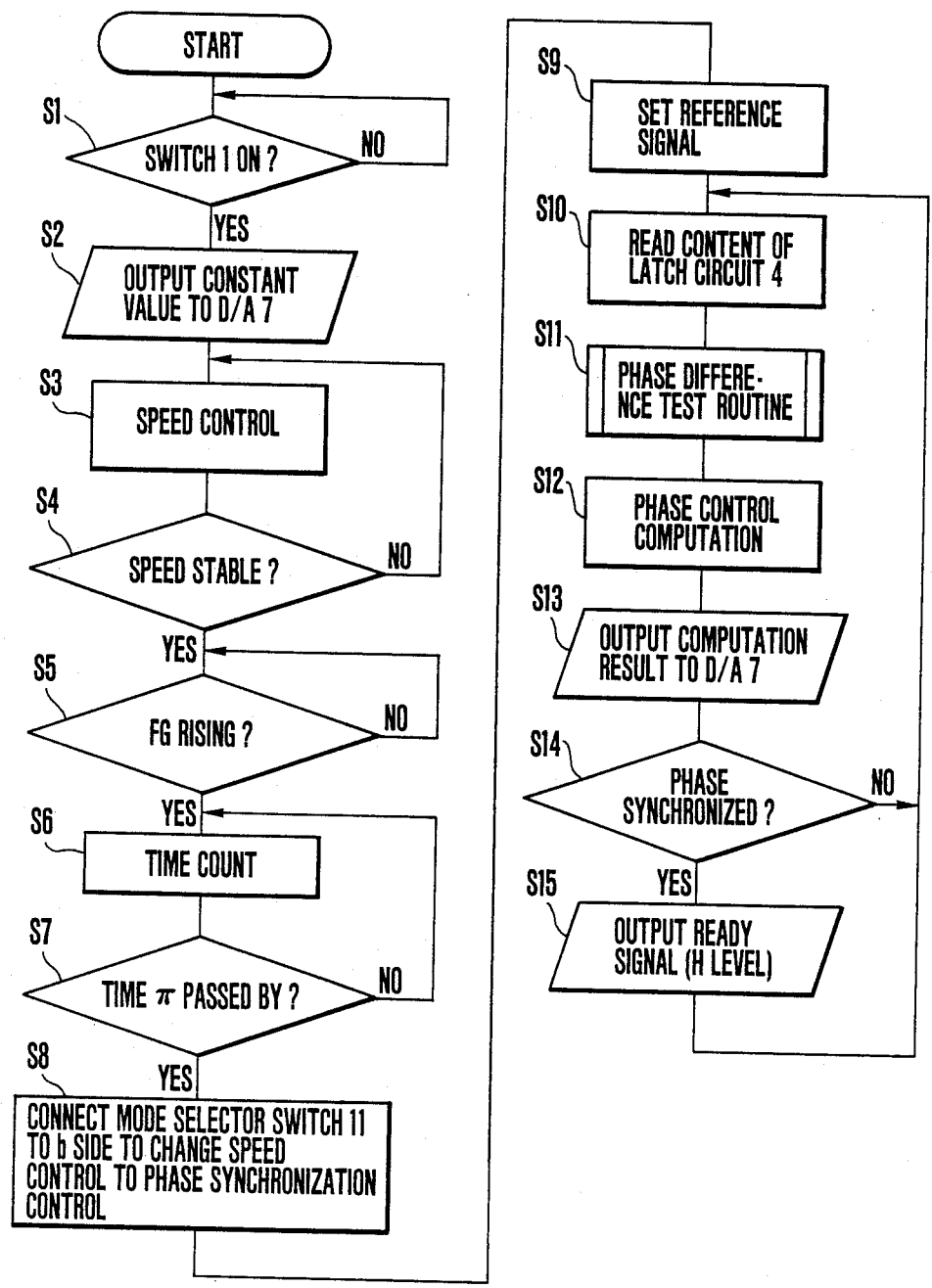
FIGS. 4 and 5 are flowcharts illustrating an example of the manner in which the camera of FIG. 2 operates.

The operation of the circuit of FIG. 2 is explained by reference to FIGS. 3 to 5. In this embodiment, the rotation of the motor 9 is controlled in such a manner that the motor 9 is synchronized with the vertical synchronizing signal of the video signal, and when in phase synchronization, the period of the FG signal is equalized to the period of the reference signal 17, and the phase difference between the rising edges of the signals FG and 17 is $\pi$.

First, the motor 9 is assumed to be at a standstill. At an initial time just before the motor 9 starts to rotate, the switch 11 is in its "a" position, or the speed control mode is selected. When the start switch 1 is turned on, the flow advances from step S1 to S2 where the computer 2 outputs to the D/A converter 7 a constant value large enough to activate the motor 9.

Step S3 then takes place where the speed of the motor 9 is controlled in the following manner and is followed by step S4 where whether or not the speed is stabilized is examined in the computer 2. That is, at first in step S3, the signal from the D/A converter 7 is applied to the drive circuit 8, and the signal based on this from the drive circuit 8 is supplied to the motor 9. Hence, the motor 9 starts to rotate. As its speed increases, the FG circuit 10 produces pulses at frequencies proportional to the speed of rotation of the motor 9. Since the switch 11 is in its "a" position, the content of the timer counter circuit 3 is held in the latch circuit 4 at a time when each rising edge of the FG signal occurs, then reset, and then starts to count from 0 again. Therefore, the latch circuit 4 retains the period of the FG pulse each time the rising edge of the FG pulse occurs. The computer 2 computes the difference of the period of the held FG pulse with a control target period (or, for example, in NTSC system, equal to a vertical synchronizing signal period of 1/60 sec.) as the discrepancy and produces an output to the D/A converter 7 representing an intensity of current to be supplied to the motor 9. Thus, the speed of motor 9 is regulated. In step S4, whether or not the speed of rotation of the motor 9 is maintained sufficiently stable at a given value is examined by the computer 2 based on the aforesaid discrepancy. If it is above a prescribed value, as the speed is taken as unstable, the flow returns to the step S3. If below the value, a step S5 is executed.

In the step S5, the computer 2 tests the FG pulse for the rising edge. If so, the next step S6 follows so that the counter in the computer 2 starts to count time from the time at which the FG pulse rises. Then in the next step S7, the computer 2 detects when a time interval, determined by subtracting one half of the synchronized period of the FG pulse from the actual period of the FG pulse (namely, $\pi$), has elapsed from the start of counting. Upon detection, the flow further advances to a step S8.

In the step S8, the computer 2 changes over the switch 11 to the "b" position (phase control mode). Then in the next step S9, the reference signal generation timing signal 16 from the computer 2 is allowed to enter the control reference signal forming circuit 6. At the termination of duration of the time interval, $\pi$, from the rising edge of the FG pulse, the computer 2 then permits the circuit 6 to start production of the reference signal 17. It should be pointed here that in the steps S6 and S7, by counting the above-identified time interval, it is made possible to bring the phase difference between FG pulse and the reference signal to $\pi$. Such a situation is illustrated in the pulse timing chart of FIG. 3.

Thereby, the counter circuit 3 is for now reset each time the output signal of the circuit 6 rises.

Then in a step S10, the computer 2 reads in the content of the latch circuit 4. The content of the latch circuit 4 represents the counted value of time by the circuit 3 from the rising edge of the reference signal 17 to that of the FG pulse representing the phase difference between them.

In the next step S11, a phase difference test routine, to be described later, is executed. In this routine, the discrepancy is between the actual and ideal phase differences of the FG pulse from the reference signal 17 is determined. If it is larger than a prescribed value, the actual phase difference is corrected.

In the step S12, the computer 2 derives the amount of adjustment on the basis of the amount of discrepancy. Then in the step S13, the output (that is, representing the aforesaid amount of adjustment) of the computer 2 is applied to the D/A converter 7, thereby the phase of rotation of the motor 9 is adjusted in accordance with the discrepancy. Then in the step S14, whether or not the phase difference between the reference signal and FG pulse detected on the basis of the read-in content of the latch circuit 4 reaches the ideal one, in other words, whether or not they are synchronized in phase, is determined by the computer 2. If not synchronized in phase, the flow returns to the step S10. If in synchronization, the flow advances to a step S15 where the computer 2 produces a READY signal of high level. The flow then returns to the step S10.

Figure 5:
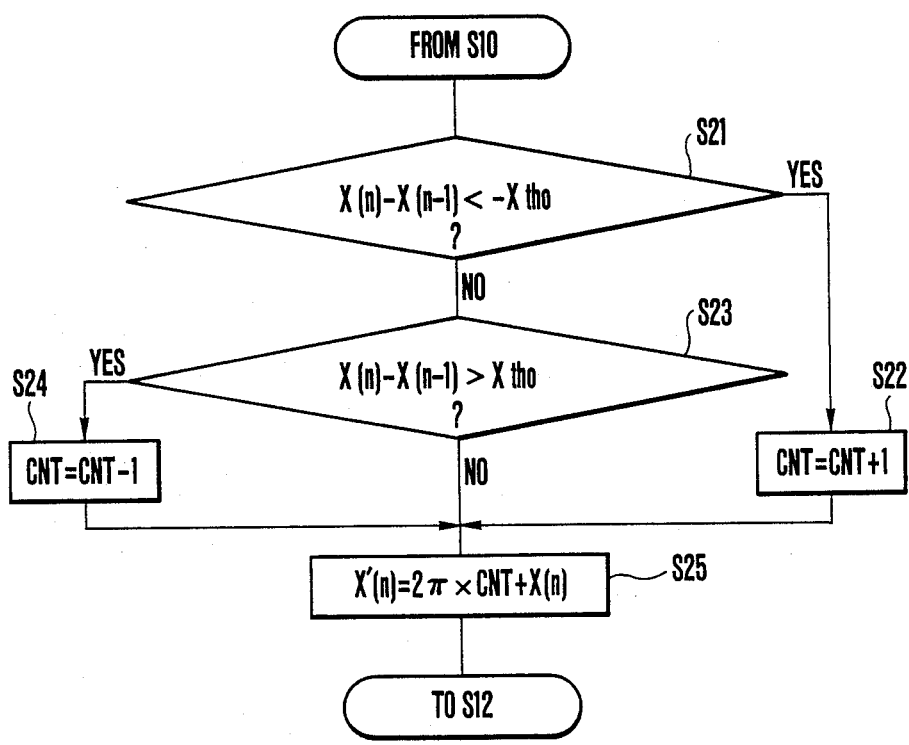

Let us now explain the routine for testing the phase difference between the reference signal 17 and the FG pulse signal in the step S15 by reference to FIG. 5. As shown in FIG. 5, in a first step S21, the phase difference $X(n)$ between the reference signal 17 and the FG pulse signal at a time point n is tested for $X(n)-X(N-1)<-Xtho$, where $\pm Xtho$ represents the maximum allowable range of variation of the phase difference during each period of the reference signal 17 on the basis of the time constant of a system to be controlled and the rate of change of the phase difference to the load change due to the external disturbance (in one period of the reference signal 17). In other words, the change of the phase difference due to the ordinary external disturbance is at most $\pm Xtho$ for one period of the reference signal 17.

Figure 6:
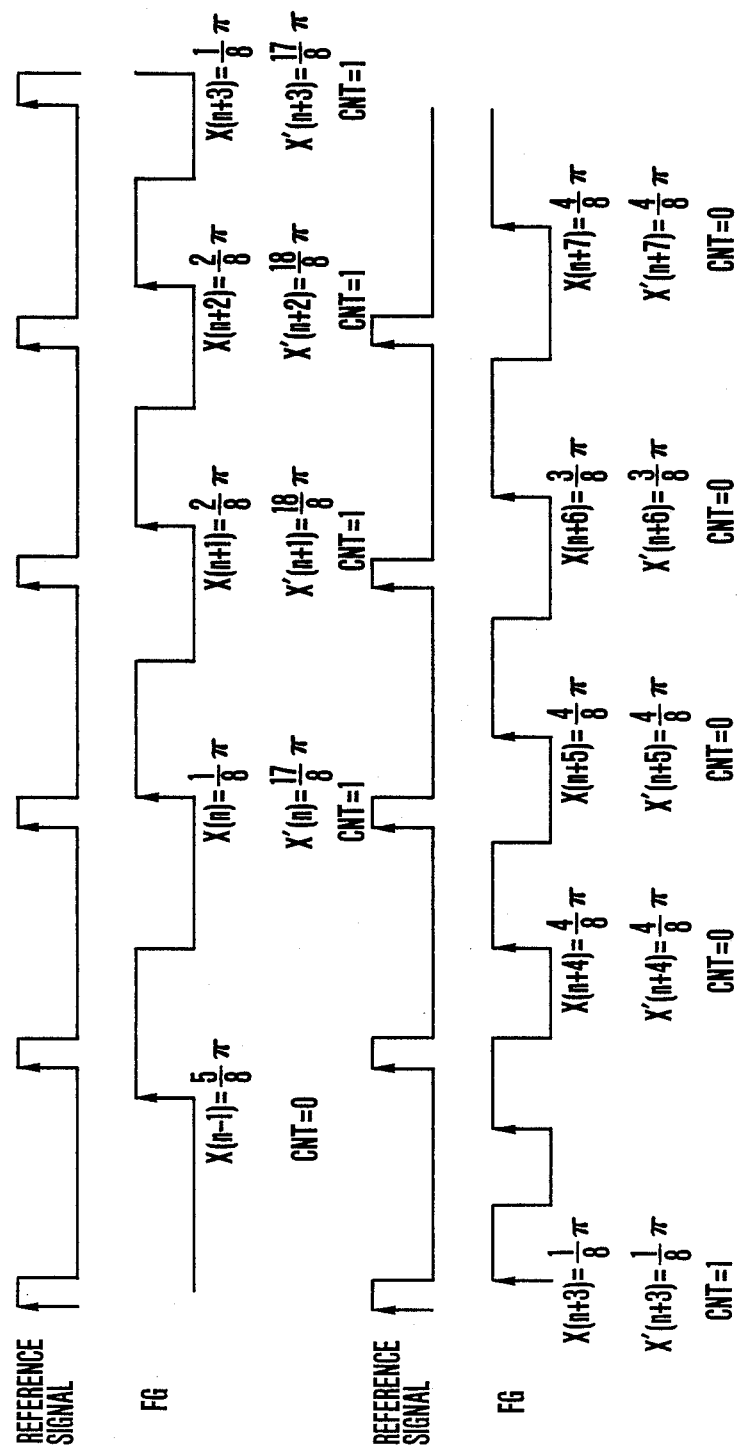

Suppose Xtho is taken at a value of, for example, $(2/8)\pi$. As shown in FIG. 6, on assumption that the phase difference between the reference signal 17 and the FG pulse signal has a value of $(15/8)\pi$ in an $(n-1)$th cycle of sampling, and it is $(\frac{1}{8})\pi$ at the next or n-th cycle of sampling, for, as is understandable from the time constant of the system to be controlled, there is no possibility for the change of the phase difference of reaching a larger value than $2\pi/8$ in every one period of the reference signal, it is at this point in time that the FG pulse may be taken as delayed by more than $2\pi$ relative to the reference signal. In this step S21, therefore, we have $$x(n) - x(n-1) = \frac{1}{8}\pi - \frac{15}{8}\pi = \frac{-14}{8}\pi < -xtho$$

So, the flow is allowed to advance to a step S22 where a counter CNT in the computer 2 is incremented one so that its content changes from 0 to 1. The flow then advances to a step S25 where the discrepancy X'(n) is computed by the computer 2 based on a formula: $X'(n) = CNT \times 2\pi + x(n)$. In this case, a correction results that $X'(n) = (17/8)\pi$. Based on this, the steps S12, S13, S14 and S10 are performed. The flow returns to the step S11 again. Thus, the period of the FG pulse becomes progressively shorter.

Assuming that $$x(n+3) = \frac{1}{8}\pi, x(n+4) = \frac{4}{8}\pi$$

are reached, then we have $$x(n+4) - x(n+3) = \frac{4}{8} - \frac{1}{8}\pi > Xtho$$

So the step S21 is followed by a step S23, from which the flow advances to a step S24 where the counter CNT is decremented one, changing its content to CNT=0. Then in the next step S25, $x'(n+4) = CNT \times 2\pi + x(n+4) = 0 \times 2\pi + x(n+4) = x(n+4)$, or $(4/8)\pi$ is obtained. In such a manner, even if the FG pulse is displaced from the reference signal 17 by more than $2\pi$, their phase difference can be brought back to within the range of 0 to $2\pi$ without failure. Thus, it is maintained stable in the range.

It should be noted that since, in this embodiment, the FG pulse (for example, 16 pulses for every one revolution of the motor) is used for phase control, a higher accuracy of phase synchronization is possible than when the PG pulse (1 pulse for every one revolution of the motor) is used. After the phase synchronization has been established, as the READY signal of H level 15 is produced in the step S15, the one-shot circuit 20 produces a pulse whose width is longer than one period of the reference signal 17 and shorter than two times the period. Then, as the motor 9 rotates, the PG 19 produces a signal 18 of H level once for one revolution at a specific phase. Therefore, when the output of the one-short circuit 20 changes to H level, or the READY signal 15 representing the establishment of the phase synchronization changes to H level, and when the output signal of the PG 19 is H level, the output of the AND gate 21 changes to H level, thereby the system reference signal forming circuit 5 is set.

Hence, the timing of the video signal processing system including the image pickup system in the electronic still camera can be quickly obtained by that system reference signal forming circuit 5. Moreover, at this time, the recording medium 25 and the reference signal forming circuit 5 are in perfect synchronization.

Thus, according to the present invention, when starting energization of the motor, instead of controlling the phase based on the synchronizing signal, the speed only is made controlled with an advantage of removing the influence of the phase error signal. Therefore, the time necessary for the speed to be stabilized is shortened. Another feature of the invention is that it is after the speed of the motor has been stable, the motor control is changed over from the speed mode to the phase mode. Still another feature is that this phase control reference signal 17 is first brought into phase coincidence with the phase of rotation of the motor, thereby giving an additional advantage that the motor phase, variation is lessened when the speed control mode changes over to the phase control mode, and, therefore, phase synchronization is established in a shorter time. This leads to produce a further advantage that the video signal can be quickly and easily synchronized with the phase-synchronized motor.

Though the foregoing embodiment has been described in connection with the ideal phase difference between the reference signal 17 and the FG pulse signal taken at $\pi$, there will be a situation that when changing over to the phase control (synchronizing) mode, despite, as the counting starts from the rising edge of the FG pulse, the reference signal 17 being set in such a timing that the phase difference takes $\pi$, the first actual phase difference gets $\pi$ as it is influenced by a load change or the like during the period of one pulse of the FG signal. If such a situation is encountered, the phase difference must later be changed back to $\pi$. So the first phase difference after the setting of the reference signal in the step S9 may be taken as the phase control target for the step S11 and those that follow so that the phase difference is retained. This method can rather make shorter the time necessary to reach the phase synchronization. But, if the first phase difference is far away from $\pi$, namely, 0 or $2\pi$, the phase target must be changed to $\pi$, and the actual later phase difference must be brought back to this new phase difference target of $\pi$. Since, as the ideal phase difference would be otherwise taken at a value near 0 or $2\pi$, for example, at $15\pi/8$ as shown in FIG. 1, the delay of the phase of FG pulse from the phase of the reference signal by, at least, ever more $\pi/8$, results in that the latched content of the computer 2 becomes less than $\pi/8$. This implies that, though the delay is really extended from $15\pi/8$ by more than $\pi/8$, the computer 2 will mistake it for the reduction from $15\pi/8$ to less than $\pi/8$. Thus, the later control will become very difficult. From the foregoing reason, it is preferred that the set value of the ideal phase difference does not fall beyond a range of 0 to $2\pi$, for example, is near or at $\pi$ as in the embodiment of the invention.

Though, in the embodiment, the recording medium is rotated relative to the head, the present invention is applicable to another type camera in which the head is rotated relative to the medium which is held stationary during recording. In essence, the invention is applicable to any type of camera in which either one of the head and medium rotates relative to the other.

The synchronizing signal source usable in the invention is, of course, required to form various synchronizing signals with which not only video signals are formed and processed in the image pickup device, but also the readout video signals from the image pickup device are treated by adding a blanking signal or the like.

Also in the reproducing apparatus, synchronizing signals are necessary to clamp the video signals and to separate identification (ID) signals out of the video signals. For this reason, the present invention is applicable also to such reproduction apparatus.

It is also possible to apply the invention to other types of recording media and heads than magnetic ones, for example, photomagnetic recording media and recording or reproducing head.

Though, in the embodiment of the invention, the FG pulse is used in the phase control means, a PG pulse may be otherwise used to effect an equivalent result. But, the use of the FG pulse enables the phase to be controlled at a faster speed with a higher accuracy, because its period is shorter than that of the PG pulse.

As has been described above, according to the present invention, a rotary body drive device of widened phase control range with good stability of synchronization against large changes of the load is realized.

What is claimed is:

1. A rotary body drive device comprising:
   (a) rotation drive means for rotational driving of a rotary body;
   (b) detecting means for detecting a phase of rotation of said rotation drive means;
   (c) a reference signal source for producing a periodic signal; and
   (d) phase difference detection means for detecting a phase difference between the periodic signal produced from said reference signal source and an output of said detecting means;
   (e) control means for controlling said rotation drive means in correspondence to the phase difference detected by said phase difference detection means, thereby controlling the phase of rotation of said rotary body; and
   (f) correction means for correcting a control state of said control means relative to said rotation drive means, said correction means being arranged to compare a variation amount of said phase difference in a predetermined period with a predetermined value, in which said correction means adds a predetermined constant value to said phase difference as a phase correcting output when said variation amount of said phase difference exceeds said predetermined value and does not add the constant value to said phase difference when said variation amount of said phase difference does not exceed said predetermined value.

2. A device as claimed in claim 1, wherein said rotation drive means is an electric motor.

3. A device as claimed in claim 2 wherein said detecting means is means for producing one signal representing the phase of rotation of said motor each time said motor rotates one revolution.

4. A device as claimed in claim 1, wherein said correction means compares said amount of variation with said predetermined value, whereby when said amount of variation exceeds said predetermined value, a phase correcting amount corresponding to one period of said reference signal is added to said phase difference to form a corrected output, and when said amount of variation does not exceed said predetermined value, said phase difference is outputted without alteration.

5. A device as claimed in claim 1, wherein said means for detecting the phase of rotation is means for producing a prescribed number of pulses for every one revolution of said rotation drive means.

6. A device as claimed in claim 5, wherein said prescribed value is determined by a driving ability of said rotation drive means and an interval between two successive pulses produced by said means for detecting the phase of rotation.

7. A device as claimed in claim 1, wherein said rotation drive means is means for causing a disk to rotate.

8. A device as claimed in claim 1, wherein said rotation drive means is means for causing a magnetic sheet to rotate.

9. A device as claimed in claim 7, wherein said disk is for recording video signals.

10. A device as claimed in claim 8, wherein said magnetic sheet is for recording video signals.

11. A drive device for periodically moving an object, including:
    (a) drive means for driving said object so as to move periodically;
    (b) detecting means for detecting a phase of said periodic motion;
    (c) a reference signal source for producing a periodic signal; and
    (d) phase difference detection means for detecting a phase difference between the periodic signal produced from said reference signal source and an output of said detecting means;
    (e) control means for controlling said drive means in correspondence to the phase difference detected by said phase difference detection means thereby controlling the phase of periodic motion of said object; and
    (f) correction means for correcting a control state of said control means relative to said drive means, said correction means being arranged to compare a variation amount of said phase difference in a predetermined period with a predetermined value, in which said correction means adds a predetermined constant value to said phase difference as a phase correcting output when said variation amount of said phase difference exceeds said predetermined value and does not add the constant value to said phase difference when said variation amount of said phase difference does not exceed said predetermined value.

12. A device as claimed in claim 11, wherein said drive means is a rotating motor and said periodic motion is a rotating motion.

13. A device as claimed in claim 11, wherein said correcting means compares said amount of variation with said predetermined value, whereby when said amount of variation exceeds said predetermined value, a phase correcting amount corresponding to one period of said reference signal is added to said phase difference to form a corrected output, and when said amount of variation does not exceed said predetermined value, said phase difference is outputted without alternation.

14. A device as claimed in claim 11, wherein said detecting means for detecting the phase of said periodic motion is means for producing a prescribed number of pulses for every one period of said periodic motion.

15. A device as claimed in claim 14, wherein said prescribed value is determined by a drive ability of said drive means and an interval between the pulses produced by said means for detecting the phase.

16. An apparatus comprising:
    (a) a head for recording or reproducing information;
    (b) drive means for periodically displacing the relative positions of said head and a recording medium;
    (c) means for producing a reference signal synchronized with the period if periodic displacement, depending upon the fact that a relative speed of said head and said recording medium, produced by said drive means, has reached a predetermined speed value;

(d) means for controlling said drive means, depending upon said reference signal, to control the period of the periodic relative movement of said head and said recording medium;

(e) correction means for correcting a control state of said control means relative to said drive means, said correction means being arranged to compare a variation amount of said period in a predetermined period with a predetermined value, in which said correction means adds a predetermined constant value to said period as a period correcting output when said variation amount of said period exceeds said predetermined value and does not add the constant value to said period when said variation amount of said period does not exceed said predetermined value; and (f) means for forming synchronizing signals for controlling a timing for processing the information to be recorded or reproduced by said head in response to the production of said reference signal.

17. An apparatus as claimed in claim 16, wherein said reference signal forming means includes:
(a) means for detecting that the speed of displacement by said drive means has reached the prescribed value; and
(b) means for producing a reference signal synchronized with the period of said periodic displacement in response to detection of the fact that said speed of displacement has reached the prescribed value by said detecting means.

18. An apparatus as claimed in claim 17, wherein said control means includes:
(a) detecting means or detecting said displacement, said means producing a pulse signal each time said periodic displacement takes a prescribed phase; and
(b) means for controlling said drive means in accordance with the phase difference between said reference signal and said pulse signal.

19. An apparatus as claimed in claim 17, further comprising:
means for processing the information to be recorded or reproduced by said head, said means processing said information in synchronism with said synchronizing signals.

20. An apparatus as claimed in claim 16, wherein said recording medium is a disk, and said drive means is means for rotating said disk.

21. An apparatus of claim 20, wherein said disk is a magnetic sheet.

22. An apparatus as claimed in claim 21, wherein said head is a magnetic head.

23. An apparatus as claimed in claim 16, wherein said information is video signals.

* * * * *

UNITED STATES PATENT AND TRADEMARK OFFICE
CERTIFICATE OF CORRECTION

PATENT NO. : 4,855,654
DATED : August 8, 1989
INVENTOR(S) : Nobuo Fukushima

It is certified that error appears in the above-identified patent and that said Letters Patent is hereby corrected as shown below:

In the heading of the Patent, it should read:

[73]   Assignee:   Canon Kabushiki Kaisha

Signed and Sealed this

Seventeenth Day of July, 1990

Attest:

HARRY F. MANBECK, JR.

*Attesting Officer*   *Commissioner of Patents and Trademarks*